INVENTORS
Charles W. Berkoben
Rankin J. Bush
BY
Frank E. Miller
ATTORNEY

Oct. 30, 1951     C. W. BERKOBEN ET AL     2,573,386
INERTIA OPERATED CONTROL DEVICE
Filed Sept. 28, 1948     2 SHEETS—SHEET 2
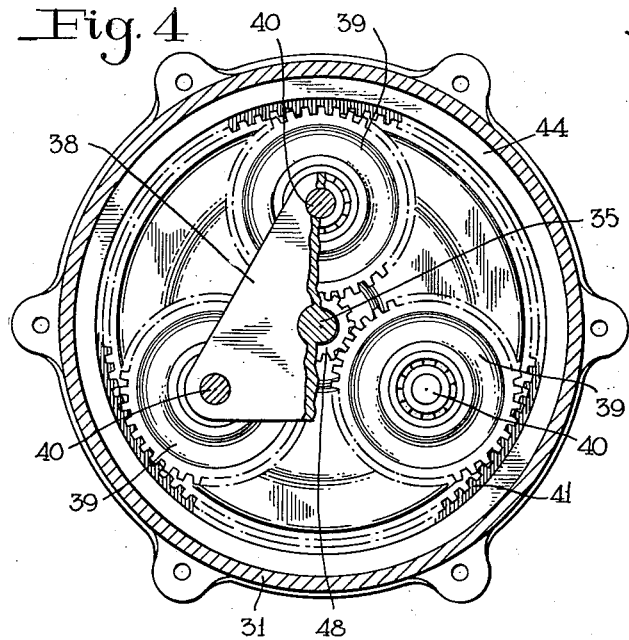
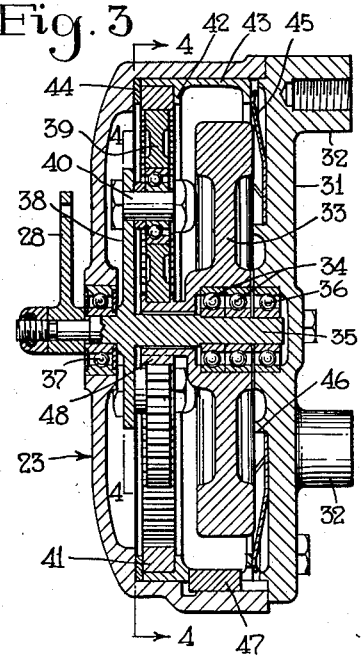
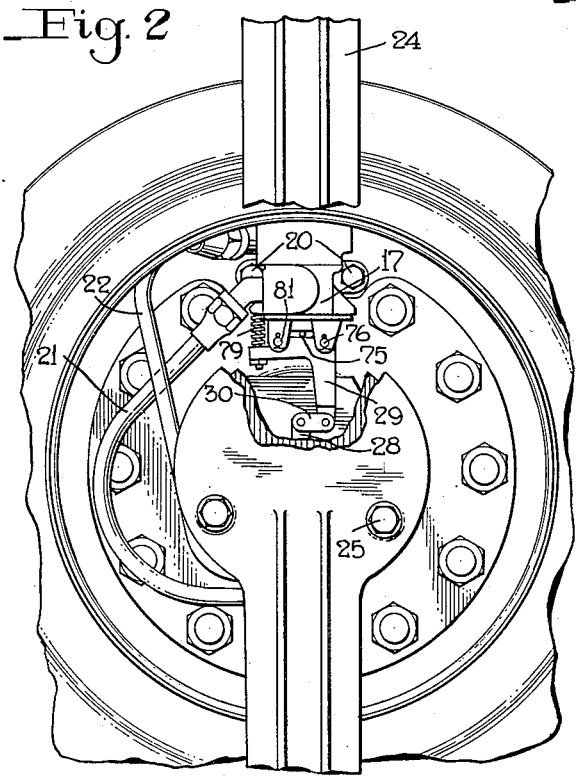
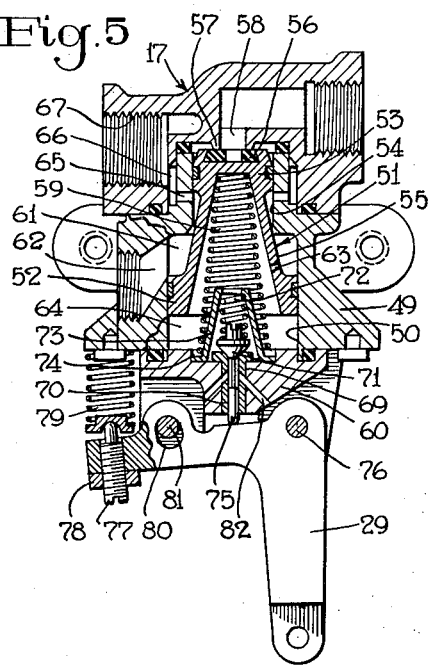
INVENTORS
Charles W. Berkoben
BY Rankin J. Bush
Frank E. Miller,
ATTORNEY Patented Oct. 30, 1951

2,573,386

UNITED STATES PATENT OFFICE 2,573,386

INERTIA OPERATED CONTROL DEVICE

Charles W. Berkoben, Irwin, and Rankin J. Bush, Greensburg, Pa., assignors to Westinghouse Air Brake Company, a corporation of Pennsylvania Application September 28, 1948, Serial No. 51,546

6 Claims. (Cl. 188—181)

1

This invention relates to an inertia operated control device and more particularly to an inertia operated control device adapted to function in the control of wheel brakes on the wheels of airplane landing gear to prevent sliding of the wheels by reason of brake action.

The larger and faster types of airplanes are provided with wheel brakes which are manually controlled by the pilot to effect landing of such planes on short runways and to assist in guiding the plane when taxying about the field.

When landing, the plane wheels initially contact the runway and then the plane may bounce or leave the runway once or twice before the plane speed is reduced so as to maintain contact with the runway. Even after the plane has ceased to bounce, there is great variation of weight on the wheels due to the wings restraining the plane from following the contour of the runway.

Due to the great variation of weight on the wheels of a plane when landing, as just described, and the consequent wide variation of adhesion of the wheel tires to the runway surface, the pilot is unable to control the degree of application of the brakes to avoid sliding of the wheels due to the fact that a given degree of brake application which does not cause sliding of the wheels for a high adhesion condition of the wheel tires will cause sliding of the wheels under a low adhesion condition. Wheel sliding is undesirable in that it causes wear of the tread of the rubber tires on the wheels which if prolonged may result in tire blow-out and in rough handling of the plane and sometimes in actual physical damages to the plane and its crew or passengers due to overturning of the plane.

The preventing of wheel sliding in landing airplanes is thus of great importance. Due to the fact that the wheels are folded into the fuselage during flight, the provision of any mechanism to prevent wheel sliding presents certain mechanical and space problems, solution of which is difficult. Also, due to the fact that the wheels are accelerated from a standstill to the landing speed of the plane as they engage the runway, the wheel slide protection device must be built to withstand the physical stresses exerted on the parts. In view of the fact, also, that temperature encountered in flight may range to 50 degrees (Fahrenheit) below zero it is necessary that any wheel slide protection to operable reliably at such low temperature.

It is therefore one object of this invention to provide an improved inertia operated control device suitable for application to an airplane to prevent sliding of the wheels induced by brake action at the time of landing.

Another object of this invention is to provide an inertia operated control device suitable for application to an airplane to detect the slipping condition of the airplane wheels produced by brake application when landing, and to effect automatically a release of the brakes before the wheel rotative speed is reduced to zero and the wheel is dragged along the runway in a locked or sliding condition. The terms "slip" and "slide" and their variants, as used herein, are not synonymous. The term "slip" identifies the rotation condition of the wheel while rapidly decelerating toward a locked condition, whereas the term "slide" identifies the locked or non-rotation condition of the wheel of a moving airplane.

Other and more detailed objects of this invention will appear in the following description when read in conjunction with the accompanying drawings, wherein, Fig. 1 is a sectional assembly view of a conventional airplane wheel to which an inertia operated control device constructed according to one embodiment of this invention is applied.

Fig. 2 is an end view of the wheel and inertia operated control device assemblage showing, in particular, the manner in which a release valve device is operated by the inertia device.

Fig. 3 is a sectional view of the inertia operated control device showing details of construction and arrangement of parts.

Fig. 4 is a sectional view, taken on the line 4—4—4—4 of Fig. 3, showing in further detail the construction of the inertia operated control device and illustrating in particular the means for driving the inertia element of the device.

Fig. 5 is a sectional view of a release valve device which may be used in conjunction with this inertia operated control device for releasing brake applying pressure when a wheel slip condition is detected by the control device.

Figure 1:
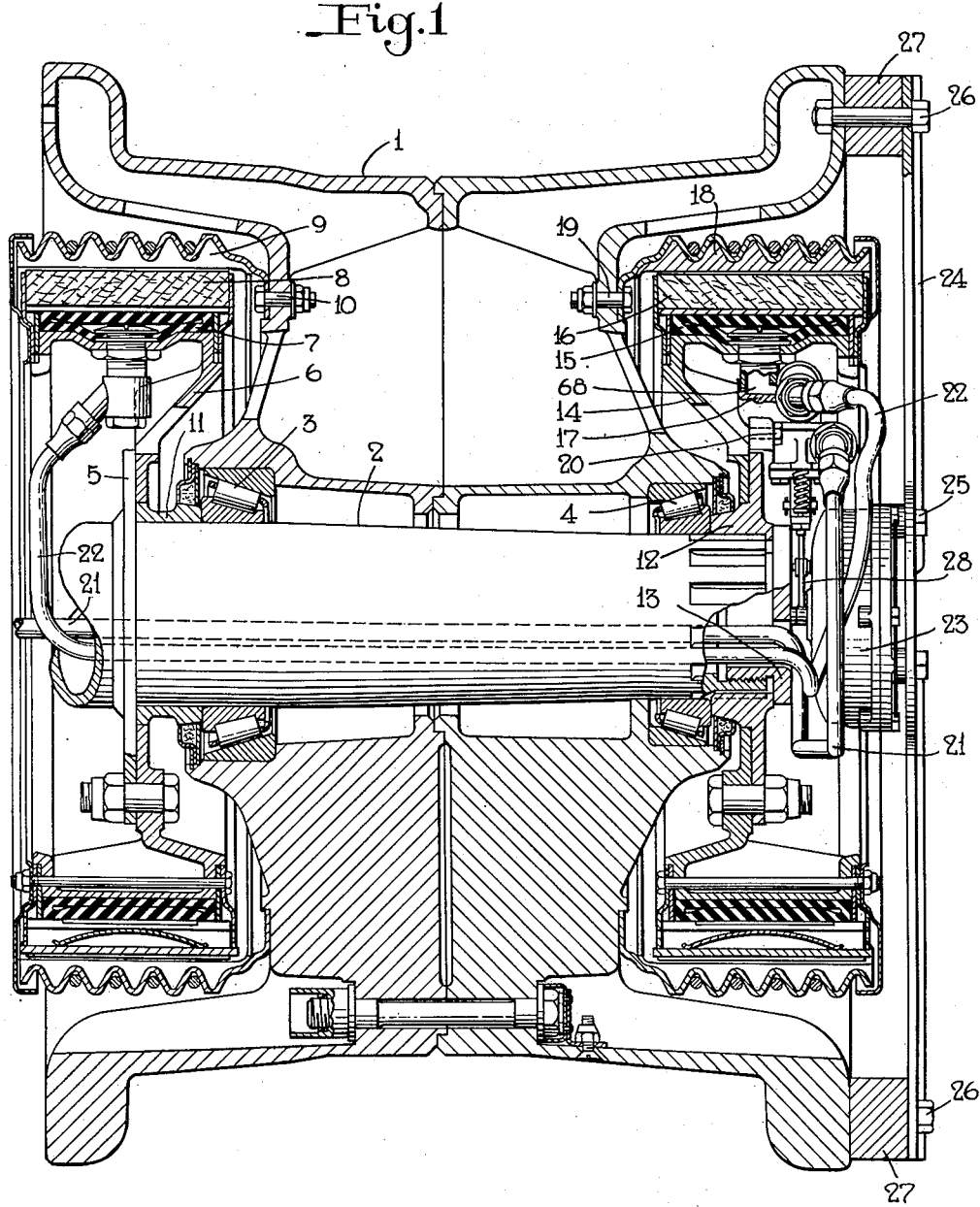

Referring to Fig. 1, there is illustrated a wheel 1, adapted to receive a tire (not shown), mounted on a hollow axle 2 by anti-friction bearings 3 and 4. A shoulder 5 on the axle serves as a mounting for the stationary brake elements, including a mounting disc 6, an annular brake tube 7 and an annular segmented brake shoe 8. The brake shoe 8 is encircled by a conventional brake drum 9 which is secured to the wheel 1 by a plurality of bolts 10. The shoulder 5 also serves as a stop for a spacer 11 against which the inner ring of bearing 3 is stopped. The bearing 4 is held in place by an outer ring or disc member 12 which has a splined fit on the axle 2, the member 12 is secured in place by a screw 13 that engages an internally threaded bore at the outer end of the axle. The member 12 serves also as a mounting support for the stationary brake elements including an annular disc 14, an annular brake tube 15, an annular segmented brake shoe 16 and a release valve device 17. The brake shoe 16 is encircled by a brake drum 18 which is secured to the wheel 1 by a number of bolts 19. The release valve device 17, shown in detail in Fig. 5, is secured to the disc 14 by screws 20. A brake supply pipe 21 is connected to the release valve device, said release device being also connected by a pipe 22 to the brake tube 7 at the opposite side of the wheel.

According to our invention, an inertia operated control device 23 is mounted on a bracket 24 by a number of screws 25, the bracket 24 extending diametrically of the wheel and being secured at opposite ends to the rim of the wheel by bolts 26. Suitable spacers 27 are provided for positioning the inertia operated control device in spaced relation beyond the end of the axle 2. The inertia operated control device 23 is attached to the bracket 24 in such a position as to be coaxially related to the axle 2 and wheel 1 with which it rotates. A lever 28 extends from the inertia operated control device and is connected to an operating lever 29 of the release valve device by a link 30 shown in Fig. 2.

Referring to Fig. 3, the inertia operated control device 23 comprises a casing 31 having a plurality of peripherally spaced lugs 32, shown as three in number, into the tapped bores of which extend the screws 25 for securing the device to bracket 24. An inertia wheel 33 is mounted by anti-friction bearings 34 on a rotatable shaft 35 that is, in turn, journaled in anti-friction bearings 36 and 37 in the casing 31. Formed integral with or attached to shaft 35 is a triangular member 38 which is arranged to carry three rotatable gear wheels in isoplanar equi-angular relation to each other and equi-distant from the shaft 35.

Gears 39 are rotatably mounted by anti-friction bearings on suitable axially extending bolts 40 attached to the triangular member 38. The gears 39 are arranged to mesh with and move in hypocycloidal relation to a ring gear 41. Ring gear 41 is mounted in a conforming recess formed between an annular shoulder 42 on a cylindrical follower 43 and a friction ring 44 that is firmly secured in the casing.

A spring 45 between the casing and the follower urges the follower 43 in an axial direction in the casing so as to frictionally grip the ring gear and cause it to normally rotate with the casing. The spring 45 comprises an annular ring portion fitting about a shoulder 46 in the casing, said ring having radially extending spring fingers for engaging the end of follower 43. A key 47 engaging keyways in both the follower 43 and the casing locks said follower to said casing for rotation therewith while permitting the necessary axial movement of the follower to provide frictional gripping engagement with the ring gear 41. The gears 39 mesh in epicycloidal relation with a pinion 48 formed on a hollow hub-like extension of the inertia wheel 33 through which shaft 35 extends. The arrangement of the ring gear 41, the gears 39 and pinion 48 is such that rotation of the casing 31 causes a corresponding rotation of the inertia wheel. Upon rotation deceleration of the casing 31, the forces exerted on gears 39 is such as to cause a torque force to be exerted on the triangular member 38 tending to cause rotation thereof.

The release valve device 17, shown in sectional view in Fig. 5, comprises a casing 49 provided with a bore 50 in which is located a piston valve device 51 comprising a piston 52 operative in said bore and a disc type piston valve 53 of smaller diameter, operative in a bore 54 of correspondingly smaller diameter, the two bores being coaxially related and piston 52 and piston valve 53 being connected by a tubular stem 55. The piston valve 53 is further provided with an annular gasket seal 56 adapted to be seated on an annular rib 57 surrounding an exhaust passage 58.

A coil spring 59 is interposed between the piston valve device 51 and a cover 60 to urge said piston valve device to a position in which the seal 56 contacts with and seals against the seat rib 57.

Formed in surrounding relation to the stem 55 is an annular chamber 61 in open communication with pipe 21 secured to the casing by a threaded connection 62. An orifice 63, in the wall of stem 55, allows restricted communication between chamber 61 and a chamber 64 formed on the opposite side of piston 52. A number of drilled ports 65, in the wall of bore 54, provide communication between chamber 61 and an annular chamber 66, which chamber is open by way of a passage 67, which has screw threaded connection with the casing, to the pipe 22, also by a suitable adapter in a chamber 68 (shown in Fig. 1) to the brake tube 15.

The cover 60 is provided with a through bore 69 within which a valve seat member 70 fits in sealed relation in the bore. Valve seat member 70 has a bore in which the fluted stem of a poppet type valve 71 has a sliding fit. Valve 71 is normally urged to a seated position against the seat member 70 by a spring 72 which is retained by spring retainer 73 held in a recess 74 of the cover 60 by the spring 59. The fluted stem of valve 71 terminates in a plunger 75 having a sliding fit in the seat member 70 and extending beyond the cover 60 to be engaged by the operating lever 29 which is pivotally mounted on said cover by a suitable pin 76. One end of lever 29 is arranged, as shown in Fig. 2, to be coupled to the operating arm 28 of the inertia element 23 while the other end of the lever is provided with an adjusting screw 77 and lock nut 78 for varying the preload force of a spring 79 fitted between said lever and the casing. The lever 29 is further provided with a slot 80 into which extends a pin 81 that is secured to the cover, the arrangement being such as to limit the rocking movement of lever 28 in either direction. A number of drilled passages 82 communicate from the fluted section of valve 65 to the atmosphere.

Spring 79 functions through levers 29 and 28 to oppose the torque force tending to turn shaft 35 upon rotational deceleration of the casing. By varying the degree of preloading of the spring 79 the valve 71 is unseated only when the casing decelerates rotatively at a rate exceeding a certain rate, such as ten miles per hour per second.

*Operation*

Assuming the airplane wheel is at a standstill and the plane on which it is located is landing. As the tire engages the runway, the wheel is quickly accelerated rotatively in a clockwise direction (as seen in Fig. 2) to the landing speed of the plane. The casing 31 being secured to the wheel by the bracket 24 will turn correspondingly with the wheel. The arm 28, shaft 35 and gears 39 carried by the triangular member 38 are held against rotation with the wheel by link 30 and lever 28 of the release valve, said lever being restrained from counterclockwise rotation about pin 76 by pin 81. The ring gear 41 having a friction engagement with the casing 31 tends to turn with said casing thus exerting a limited force on gears 39 to cause said gears to act against pinion 48 and accelerate the inertia wheel 33 to a speed proportional to the speed of the wheel. The slip of the ring gear between the follower and the friction plate will limit the driving force applied to the inertia wheel and prevent damage to the inertia control device. The slipping action will thus occur until the inertia wheel is accelerated to a speed corresponding to the wheel speed.

After the plane has engaged the runway the pilot may by operation of suitable brake control means (not shown) apply the brakes to any desired degree. Fluid brake pressure corresponding to the degree of brake application is established in pipe 21 (see Fig. 1) which is connected to chamber 61 of the release valve device 17 (see Fig. 5). From chamber 61 fluid under pressure flows by way of orifice 63 to equalize into chamber 64 and also flows by way of ports 65 to chamber 66 connected by a tube fitting in chamber 68 to the brake tube 15 and by pipe 22 to the brake tube 7 (see Fig. 1).

If, after the inertia wheel 33 has started to rotate, the brake forces become excessive so as to cause the airplane wheel to slip, the rate of slow down of wheel rotation is fast and the inertia wheel 33 will tend to continue its rotation at its normal rate thus exerting a force proportional to the rate of retardation of the wheel through gears 39, the triangular member 38, shaft 35 against lever 28 tending to rotate said lever in a counter-clockwise direction as viewed in Fig. 2. Lever 28 acts through link 30 against lever 29 tending to swing said lever in a clockwise direction as seen in Fig. 2 against the force of spring 79. When the force thus exerted against spring 79 exceeds the force of said spring, said force corresponding to a rate of retardation of the wheel of say 10 miles per hour per second, the lever 29 is rotated clockwise to unseat valve 71 and thereby permit fluid under pressure in chamber 64 to escape to atmosphere past said valve and through ports 82 (see Fig. 5) at a rate faster than can be supplied by way of orifice 63. Fluid pressure in chamber 61 is effective against piston 52 to move the piston in the direction of chamber 64 against the force of spring 59 until it engages the cover 60. During the movement of piston 52, the piston valve 53 passes over ports 65, thus cutting communication from chamber 61 to chamber 66, and the seal 56 is carried from the seat rib 57 to open fluid pressure in the brake tubes to the exhaust passage 58. Fluid under pressure is thus vented to atmosphere from the brake tubes and the brake forces are correspondingly released to permit the wheel to return to normal rotation, that is, to a rotative speed corresponding to the ground speed of the plane. As the wheel is accelerated to its normal speed of rotation and approaches the instantaneous speed of the inertia wheel, the force on lever 28 is diminished and spring 79 becomes effective to move said lever to the position shown in Fig. 5 in which the spring 72 is effective to seat valve 71. With valve 71 thus seated, fluid pressure in chamber 61 promptly equalizes into chamber 64 and the spring 59 promptly moves the piston device 51 to the position shown in which communication is reestablished from pressure supply pipe 21 to chamber 66 and brake tubes 7 and 15, and in which the seal 56 is seated on seat rib 57 to close the exhaust passage 58, thereby effecting reapplication of brake forces to the wheel.

Should wheel slip re-occur, the inertia operated control device is effective to again release the brake forces in the same manner just described.

The pilot can, at will, effect a release of brake forces on the airplane wheel by movement of the brake control means (not shown) to the release position. When moved to the release position the brake control means will effect a release of fluid under pressure in pipe 21, and from the brake tubes by way of chamber 66, ports 65 and chamber 61. Fluid pressure in chamber 64 is released through orifice 63 to chamber 61.

Having now described our invention, what we claim as new and desire to secure by Letters Patent is:

1. A control mechanism comprising a rotary housing, a rotary inertia element concentric with and enclosed by said housing, a ring gear frictionally held in said housing adapted to rotate therewith and arranged to slip in said housing when resisted by a certain force, a plurality of gears meshed with said ring gear in hypocycloidal relation and arranged to drive said rotary inertia element according to rotation of said ring gear, rotatable means for supporting said gears, means for yieldingly restraining rotation of said rotatable supporting means, and a control member actuated by movement of said rotatable supporting means.

2. In combination, an airplane wheel, a fluid pressure brake system, operable to effect application of brake forces to said wheel and a control device, said device comprising a rotary housing rotated by rotation of said wheel, a rotary inertia element concentric with and enclosed by said housing, a ring gear frictionally held in said housing so as to rotate therewith and arranged to slip in said housing when resisted by a force exceeding a certain force, hypocycloidal gears meshed with said ring gear and arranged to drive said rotary inertia element according to rotation of said ring gear, rotatable means for supporting said hypocycloidal gears, means for restraining rotation of said rotatable means with a certain torque, adjustable means for fixing said certain torque, and means actuated by movement of said rotatable means for releasing an application of brake forces effected by said brake system when said certain torque is exceeded.

3. In combination with an airplane wheel to which braking forces may be applied and from which braking forces may be released, a housing attached to said wheel in coaxial relation thereto so as to rotate with said wheel, a rotary inertia element enclosed in said housing, means including a movable member having a certain uniform position, for causing said rotary inertia element to be driven by rotation of said housing, means yieldingly resisting movement of said member out of its said certain uniform position and permitting movement of said member out of its said certain uniform position only in response to a certain chosen rate of change of rotational speed of said wheel, and a control element actuated by said member and adapted for governing the braking forces applied to said wheel.

4. For use with a vehicle wheel, a control mechanism comprising a housing adapted to be attached to the vehicle wheel for rotation therewith, an inertia element rotatably mounted within said housing, means for causing said inertia element to rotate by rotation of said housing, said means including a rotatable member yieldably supported in a certain non-rotative position and moved out of said position, when the wheel is decelerated rotationally, as by braking, at a rate exceeding a certain rate, and a control member actuated by said rotatable member.

5. In combination, an airplane wheel, a fluid pressure brake system operative to effect the application and release of braking forces to and from said wheel, a housing attached to said wheel and rotated thereby, an inertia element rotatably mounted within said housing, means for driving said inertia element by rotation of said housing, said last means including a member having a certain non-rotative position and which is yieldably moved out of said certain non-rotative position responsively to a torque exerted thereon when said wheel is retarded at a rate exceeding a certain rate, and means controlled by said member for effecting release and reapplication of braking forces applied to said wheel by said brake system.

6. For use with an airplane wheel that is adapted to be braked, control mechanism for preventing sliding of said wheel due to braking, said control mechanism comprising a housing attached to said wheel for rotation therewith, an inertia element rotatably mounted concentrically within said housing, a ring gear disposed concentrically within said housing and rotatable therewith, gear drive means interposed between said ring gear and said inertia element so as to effect rotation of said inertia element in accordance with rotation of said ring gear, a member carrying said gear drive means, resilient means biasing said member to a certain non-rotative position and yieldingly resisting movement of said member out of said certain position occurring in response to the torque exerted on said member when said wheel is decelerated, and a control member actuated by said member and adapted for governing the braking forces applied to said wheel.

CHARLES W. BERKOBEN.
RANKIN J. BUSH.

REFERENCES CITED

The following references are of record in the file of this patent:

UNITED STATES PATENTS

| Number | Name | Date |
|---|---|---|
| 2,068,370 | Bush | Jan. 19, 1937 |
| 2,159,778 | Bush | May 23, 1939 |
| 2,440,343 | McCune | Apr. 27, 1948 |